April 15, 1930.  S. J. EVANS  1,754,991
TROLLEY WIRE SPLICE JOINT
Original Filed Jan. 25, 1928
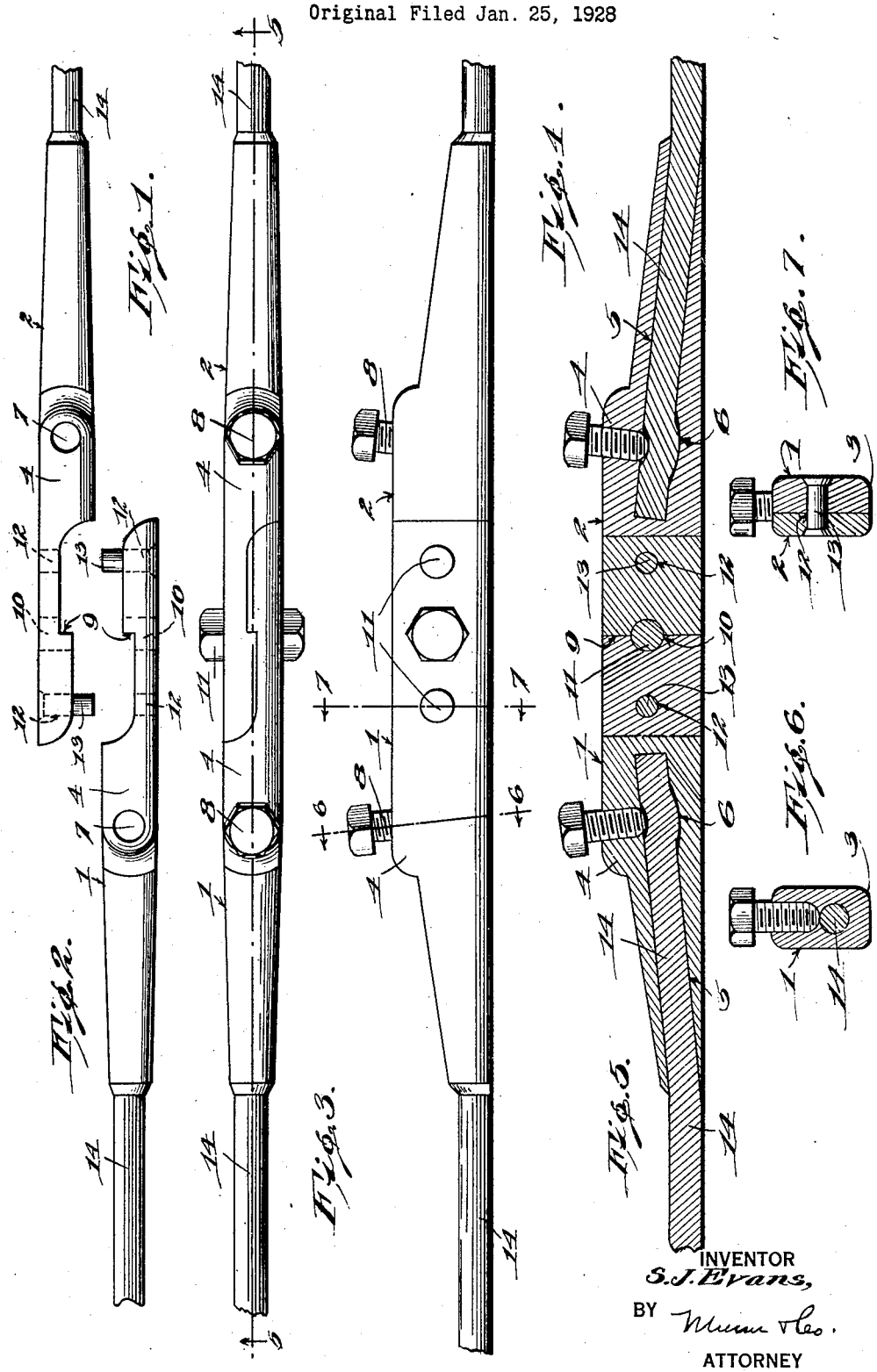
INVENTOR
S. J. Evans,
BY 
ATTORNEY Patented Apr. 15, 1930

1,754,991

UNITED STATES PATENT OFFICE

SAMUEL J. EVANS, OF PRINCETON, WEST VIRGINIA

TROLLEY-WIRE SPLICE JOINT

Application filed January 25, 1928, Serial No. 249,326. Renewed November 30, 1929.

This invention relates to wire or cable splicing joints, and is more particularly concerned with a splice joint particularly adapted for trolley wires or cables, although capable of use as a splice for wire or cables generally.

Such splicing joints are usually used to connect and electrically to bridge the abutting ends of lengths of the trolley wire, either in initially hanging the wire or in splicing a break therein after it has been installed and in use.

The joint of the present invention is particularly useful in splicing broken wires and is formed to provide a proper electrical connection, a smooth path for the trolley wheel in passing thereover, to facilitate the making of the splice and to provide a strong rigid joint.

The object of the present invention is to provide a two piece interlocking splice having proper electrical contact and mechanical strength and providing a smooth path for the trolley wheel passing thereover.

A further object of the invention is the provision of a two piece splice joint constructed to permit the abutting ends of the trolley wire to be secured to its sections and having interlocking means permitting the splice sections to be thereafter drawn together and held interlocked while permanent fastenings are applied thereto.

These and other objects and advantages of the invention are more fully described in the following detailed specification which is to be read in conjunction with the accompanying drawings forming part thereof and in which:—

Figures 1 and 2 are top plan views of the two sections of the splice joint separated and in the position to which they are to be pulled for interlocking engagement.

Figure 3 is a top plan view of the sections joined and permanently riveted together.

Figure 4 is a side elevation of the joined sections of the splice shown in Figure 3.

Figure 5 is a longitudinal vertical section on the line 5—5 of Figure 3.

Figure 6 is a transverse vertical section through the wire clamping portion of a joint section taken on the line 6—6 of Figure 4.

Figure 7 is a transverse vertical section through the section joint taken on line 7—7 of Figure 4.

The sections of the splice joint are of complementary and similar shape and may be interchangeably used. As shown the complementary joint sections 1 and 2 are each provided with a smooth rounded base surface 3 (Figures 6 and 7) to fit between the side flanges of a trolley wheel and their sides taper slightly outward from their outer ends which are slightly wider than the diameter of the trolley wire to be spliced thereby. These sections are increased in height toward their inner ends providing shouldered portions 4. From their outer ends wire tunnels 5 extend with a slight upward taper and terminate below the shouldered portions 4, being formed adjacent to their inner ends with wire holding depressions 6 to which threaded bores 7 lead downwardly from the shouldered portions 4. These bores extend in a line substantially at right angles to the inclined line of the tunnels 5 and permit the wire clamping set screws 8 threading into the bores 7 to engage and depress the ends of the trolley wire 14 inserted in tunnels 5 down into the retaining depressions 6, the slight crimp thus formed in the wires adjacent to their ends providing means additional to the clamping pressure of the set screws 8 to retain the wire ends in the joint sections 1 and 2.

Inwardly of the wire clamping screws 8, the inner ends of the joint sections are similarly reduced in transverse thickness to overlap with their outer sides flush, these portions being each recessed to provide similar cooperating vertically extending shoulders or offsets 9 which, when the sections are brought together form an interlock against longitudinal separation, the shoulders or offsets taking the longitudinal pull or strain of the wire and providing one and an efficient electric bridging contact. Centrally of their overlapping portions in line with their shoulders 9, each section is formed with a lateral bore 10 bisected by the vertical line of the shoulders 9, these bores alining when the sections are joined with their shoulders 9 in interlocked engagement, to receive a clamping bolt 11.

At opposite sides of the bores or bolt holes 10, alined rivet holes 12 are provided, these holes alining when the sections are assembled and joined as described and permitting the insertion of rivets 13 therethrough.

In the use of the splice joint, the ends of the trolley wire 14 to be joined are first inserted in the wire tunnels 5 of the sections 1 and 2 which at this time are separate. The set screws 8 are then turned down to engage and depress the ends of the wires into the depressions 6. It is to be noted that the inclines of the tunnels 5 are very gradual and that the wire 14 is not bent to any extent by its insertion therein and therefore is not weakened.

The wire having been inserted in and clamped to the two separated sections, longitudinal pull is exerted upon each to bring them toward each other until the shoulders 9 are substantially alined whereupon the sections are brought together by relative transverse movement to engage one shoulder 9 against the other. This engagement will cause the shoulders to interlock the sections together against separation by longitudinal strain and with their bolt and rivet holes alined. The clamping bolt 11 may now be inserted and tightened after which the rivets 13 may be inserted, preferably from opposite sides as shown in Figures 1 and 2, and then headed, permanently joining the two sections of the splice. The firm engagement of the interlocking shoulders is necessary to aline the bolt and rivet holes and these interlocking shoulders take the longitudinal pull or strain of the wire. The two rivets 13 hold the sections against transverse separation with their overlapping and interfitting side and bottom portions flush so that the trolley wheel will have a smooth joint to ride over. The union of the overlapping joint sections through the interlocked shoulders 9, and the two rivets 13 brings the overlapping faces in firm contact and provides a complete current bridging connection. Where a broken wire has to be spliced, it is very difficult to pull and hold splice joint sections into alinement until they can be connected. The interlocking shoulders 9 not only greatly facilitate this operation but take the strain of the longitudinal pull of the joined wire. The bolt 11 is merely used to hold the sections together while the rivets are inserted and headed, after which it is removed providing a clear path for the trolley wheel in passing thereover.

The construction described and illustrated, while representing a preferred embodiment of the invention, is intended as illustrative and not restrictive of the structural features of the invention and changes and adaptations to varying conditions in consonance with the spirit of the invention and the scope of the appended claims are contemplated.

What I claim therefore and desire to secure by Letters Patent is:—

1. A splice joint for wires or cables comprising complementary sections having overlapping shouldered portions interlocking when the sections are joined resisting longitudinal separation of the sections and having inclined wire receiving tunnels formed therein with means for crimping therein the ends of wires inserted in said tunnels.

2. A splice joint for wires or cables comprising complementary sections having overlapping portions at their inner adjacent ends shouldered to provide interlocking offsets extending substantially perpendicular to the line of spliced wire and resisting longitudinal separation of the sections, the outer ends of said sections having inclined wire receiving tunnels formed therein and having means for crimping therein the ends of wires inserted in said tunnels.

3. A splice joint for trolley wires comprising complementary longitudinally alined sections having their inner ends reduced in thickness and overlapped with their outer side faces flush, said overlapped portions being provided with interlocking offsets resisting longitudinal separation of the sections, the outer ends of said sections having inclined wire receiving tunnels formed therein, means for crimping wire inserted in said tunnels against withdrawal therefrom, and means for clamping the overlapping portions of said sections together against lateral separation with the interlocking offsets in engagement.

4. A splice joint for wires or cables comprising complementary elongated sections having their inner ends similarly reduced in thickness and vertically shouldered to overlap with the shoulders in interlocking engagement resisting longitudinal separation of the sections and with the outer faces of the sections flush at the points of overlap, the outer ends of said sections being formed with wire tunnels therein inclining slightly upward, means engaging and clamping to said sections the ends of wires inserted in said tunnels and means for holding the overlapped inner portions of said sections together against transverse separating movement with their shoulders interlocked against longitudinal separation.

5. A splice joint for trolley wires comprising separable complementary elongated sections having rounded under-surfaces to seat between the flanges of a trolley wheel and formed with wire tunnels extending inwardly from their outer ends and inclined upwardly to points spaced from the inner ends of the sections, means for clamping to said sections the ends of trolley wires inserted in said tunnels, said inner ends of the sections being similarly reduced in thickness to overlap with flush outer side faces and having interlocked offsets formed thereon extending substantially perpendicular to the line of trolley wire to resist lengthwise separation of the sections when joined, said overlapping portions having transverse bores therethrough alined by the interengagement of said offsets to receive transverse clamping means for drawing the overlapped portions together against separation and to retain the offsets in interlocked relation and against transverse displacement.

6. A splice joint for wires or cables comprising two separate complementary elongated sections having wire engaging and clamping means at their outer ends and reduced in thickness at their inner ends and vertically shouldered to provide a flush overlapping joint with flat opposed inside contacting faces having complemental laterally offset shoulders interlocking and resisting longitudinal separation of the sections when the latter are assembled with their inner ends in overlapped shoulder interengaged relation, and means for clamping said flat overlapping faces together in firm contact and against transverse displacement.

7. A splice joint for wires or cables comprising two separate complementary elongated sections having wire receiving tunnels formed therein extending longitudinally thereof from their outer ends, said sections being reduced in thickness at their inner ends and vertically shouldered to provide a flush overlapping joint with flat opposed inside contacting faces provided with complemental laterally offset shoulders interlocking and resisting longitudinal separation of the sections when the latter are assembled with their inner ends in overlapped shoulder interengaged relation, means for clamping wires inserted in said tunnels against said sections, and means for clamping said flat overlapping faces together in firm contact and against transverse displacement.

8. A splice joint for wires or cables comprising two separate complementary flat faced sections having wire receiving and clamping means thereon and having overlapping inner ends similarly reduced in thickness and vertically shouldered to interlock against longitudinal separation with inside flat faces in contact, said faces having transverse bores therethrough alined to receive a clamping member by interlocking engagement of said shoulders, said sections in overlapped joined relation presenting a continuous smooth surface at their lower edges of a width adapted to seat between the flanges of a trolley wheel.

9. A splice joint for wires or cables comprising two separate complementary elongated sections having wire receiving tunnels therein extending longitudinally thereof from their outer ends with means to clamp wires inserted in said tunnels into engagement with their sections, the inner ends of said sections being reduced in thickness to overlap and form a flush joint, the inner faces of the reduced inner portions being provided with complemental laterally offset shouldered portions interlocking by the overlapping of the inner section ends with their inner faces in contact to prevent lengthwise separation of the sections under the lengthwise pull of the attached wire ends to be spliced, said overlapping portions having transverse bores therethrough, alined by said interlocking engagement of the shouldered offsets to permit a clamping member to be inserted therethrough while the sections are held in alined position by said offsets to draw said faces together in firm contact, said sections in their overlapped clamped position presenting a smooth continuous lower surface adapted to be embraced between the flanges of a trolley wheel riding thereover.

Signed at Princeton, in the county of Mercer and State of West Virginia, this 23rd day of January, A. D. 1928.

SAMUEL J. EVANS.